United States Patent
Ohnaka (10) Patent No.: US 8,023,403 B2
(45) Date of Patent: Sep. 20, 2011

(54) INFORMATION PROCESSING APPARATUS, INFORMATION PROCESSING METHOD, AND PROGRAM

(75) Inventor: Shinobu Ohnaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 630 days.

(21) Appl. No.: 11/617,848

(22) Filed: Dec. 29, 2006

(65) Prior Publication Data
US 2007/0211621 A1   Sep. 13, 2007

(30) Foreign Application Priority Data

Jan. 5, 2006 (JP) ................. 2006-000649

(51) Int. Cl.
 *H04L 1/00* (2006.01)
(52) U.S. Cl. ....................................... 370/216
(58) Field of Classification Search ............. 370/216, 370/217
See application file for complete search history.

(56) References Cited

U.S. PATENT DOCUMENTS

| | | | | |
|---|---|---|---|---|
| 6,671,831 | B1* | 12/2003 | Sartore et al. | 714/44 |
| 7,808,897 | B1* | 10/2010 | Mehta et al. | 370/230 |
| 2002/0064126 | A1* | 5/2002 | Bhattal et al. | 370/217 |
| 2002/0116639 | A1* | 8/2002 | Chefalas et al. | 713/201 |
| 2002/0181362 | A1* | 12/2002 | Koide | 369/47.28 |
| 2003/0016624 | A1* | 1/2003 | Bare | 370/217 |
| 2003/0044092 | A1* | 3/2003 | Tanaka | 382/325 |
| 2004/0059816 | A1* | 3/2004 | Takaoka et al. | 709/224 |
| 2004/0254006 | A1* | 12/2004 | Lam et al. | 463/16 |
| 2006/0031711 | A1* | 2/2006 | Yokokura | 714/5 |
| 2007/0211621 | A1* | 9/2007 | Ohnaka | 370/216 |

FOREIGN PATENT DOCUMENTS

| | | |
|---|---|---|
| JP | 63-232654 | 9/1988 |
| JP | 10-271145 | 10/1998 |
| JP | 11-120104 | 4/1999 |

OTHER PUBLICATIONS

USB Specification R2.0, Apr. 27, 2000, p. 39,155-157, 195-198, 260.*

* cited by examiner

*Primary Examiner* — Jianye Wu
(74) *Attorney, Agent, or Firm* — Oblon, Spivak, McClelland, Maier & Neustadt, L.L.P.

(57) ABSTRACT

An information processing apparatus is disclosed which connects to a network and which controls transmission to the network of data being output by an external apparatus having at least a data output function. The information processing apparatus includes a connection switcher configured to disconnect from the network in case of a failure in data output processing by the data output function of the external apparatus and to reconnect to the network upon recovery from the failure.

11 Claims, 9 Drawing Sheets

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2006-000649 filed with the Japanese Patent Office on Jan. 5, 2006, the entire contents of which being incorporated herein by reference.

BACKGROUND OF THE INVENTION

1. Field of the Invention

The present invention relates to an information processing apparatus, an information processing method, and a program. More particularly, the invention relates to an information processing apparatus, an information processing method, and a program for preventing unnecessary data from being output onto a network.

2. Description of the Related Art

There have been cases where an application communicates with an external apparatus over a network runs away and keeps outputting unnecessary (i.e., faulty) data onto the network.

In case of such a runaway, the application was typically disconnected from the network. The application was then restarted or debugged.

Japanese Patent Laid-open No. Hei 11-120104 discloses a technique whereby the receiving application is equipped with a supervisor configured to supervise the loaded state of an input buffer so that the data found to be faulty by the supervisor will be discarded without being passed on to an upper-layer protocol processor. The technique is supposed to let the receiving application continue carrying out processes other than the reception even if the transmitting side keeps sending unnecessary data.

SUMMARY OF THE INVENTION

One disadvantage of the technique proposed by the above-cited patent document is that it merely concerns the processing on the receiving side. Unnecessary data is left getting output by the runaway application. That can lead to problems such as wasting of network bandwidths.

The present invention has been made in view of the above circumstances and provides arrangements whereby unnecessary data is prevented from getting output onto the network.

In carrying out the present invention and according to one embodiment thereof, there is provided an information processing apparatus which connects to a network and which controls transmission to the network of data being output by an external apparatus having at least a data output function, the information processing apparatus including: a connection switcher configured to disconnect from the network in case of a failure in data output processing by the data output function of the external apparatus and to reconnect to the network upon recovery from the failure.

Preferably, the external apparatus may issue a first command in case of a failure in the data output processing and may issue a second command upon recovery from the failure; and the connection switcher may disconnect from the network if the external apparatus issues the first command and may reconnect to the network if the external apparatus issues the second command.

Preferably, the information processing apparatus according to the present invention may further include a supervisor configured to supervise the data output processing; wherein the connection switcher may disconnect from the network if the supervisor detects a failure in the data output processing and may reconnect to the network if the supervisor detects a recovery from the failure.

The supervisor may preferably detect a first and a second failure individually by supervising the data output processing, the first failure being detected when a predetermined data size is not exceed by the data being output by the external apparatus, the second failure being detected when a predetermined data size is exceeded by the data being output by the external apparatus.

Preferably, the external apparatus may further include, in addition to the data output function, a status output function configured to output a status notification representing output status of the data; and if the status notification is not output periodically by the external apparatus, then the supervisor may detect the first failure.

Preferably, the information processing apparatus according to the present invention may further include a protocol processor configured to perform protocol processing on the data being output by the external apparatus; wherein the supervisor may detect the second failure based on processing result information output by the protocol processor regarding the data.

The connection switcher may preferably disconnect from the network if a predetermined command is sent from the external apparatus over the network.

Preferably, the information processing apparatus according to the present invention may further include an authenticator configured to authenticate the external apparatus.

According to another embodiment of the present invention, there is provided an information processing method which connects to a network and which controls transmission to the network of data being output by an external apparatus having at least a data output function, the information processing method including the steps of: disconnecting from the network in case of a failure in data output processing by the data output function of the external apparatus; and reconnecting to the network upon recovery from the failure.

According to a further embodiment of the present invention, there is provided a program for causing a computer to connect to a network and to control transmission to the network of data being output by an external apparatus having at least a data output function, the program including the steps of: disconnecting from the network in case of a failure in data output processing by the data output function of the external apparatus; and reconnecting to the network upon recovery from the failure.

Where the above-outlined information processing apparatus, information processing method, or program of the present invention is in use, the connection with the network is cut off in case of a failure in data output processing by the data output function of the external apparatus. Upon recovery from the failure, a communication is reestablished with the network.

In the description that follows, the term "network" will refer to a setup that connects at least two apparatuses in a manner enabling one apparatus to send information to the other apparatus. The apparatuses communicating with one another through the network may either be independent of one another or constitute internal blocks that form a single piece of equipment.

According to the present invention, as outlined above, it is possible to prevent unnecessary data from being output onto the network.

DETAILED DESCRIPTION OF THE PREFERRED EMBODIMENTS

What is described below as the preferred embodiments of the present invention with reference to the accompanying drawings corresponds to the appended claims as follows: the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention described hereunder has a specifically corresponding claim, this does not mean that the example in question is limited to that claim or has no relevance to other claims.

One embodiment of the present invention is an information processing apparatus (e.g., network communication apparatus 2 in FIG. 2) which connects to a network and which controls transmission to the network of data being output by an external apparatus (e.g., computer 1 in FIG. 2) having at least a data output function, the information processing apparatus including: a connection switcher (e.g., switching section 52 in FIG. 2) configured to disconnect from the network in case of a failure in data output processing by the data output function of the external apparatus and to reconnect to the network upon recovery from the failure.

Preferably, the information processing apparatus according to the present invention may further include a supervisor (e.g., communication failure detection section 72 in FIG. 5) configured to supervise the data output processing; wherein the connection switcher may disconnect from the network if the supervisor detects a failure in the data output processing and may reconnect to the network if the supervisor detects a recovery from the failure.

Preferably, the information processing apparatus according to the present invention may further include a protocol processor (e.g., protocol processing section 71 in FIG. 5) configured to perform protocol processing on the data being output by the external apparatus; wherein the supervisor may detect the second failure based on processing result information output by the protocol processor regarding the data.

Preferably, the information processing apparatus according to the present invention may further include an authenticator (e.g., authentication processing section 82 in FIG. 7) configured to authenticate the external apparatus.

Another embodiment of the present invention is an information processing method (e.g., switching process in FIG. 4) which connects to a network and which controls transmission to the network of data being output by an external apparatus having at least a data output function, the information processing method including the steps of: disconnecting (e.g., in step S14 of FIG. 4) from the network in case of a failure in data output processing by the data output function of the external apparatus; and reconnecting (e.g., step S16 of FIG. 4) to the network upon recovery from the failure.

Figure 1:
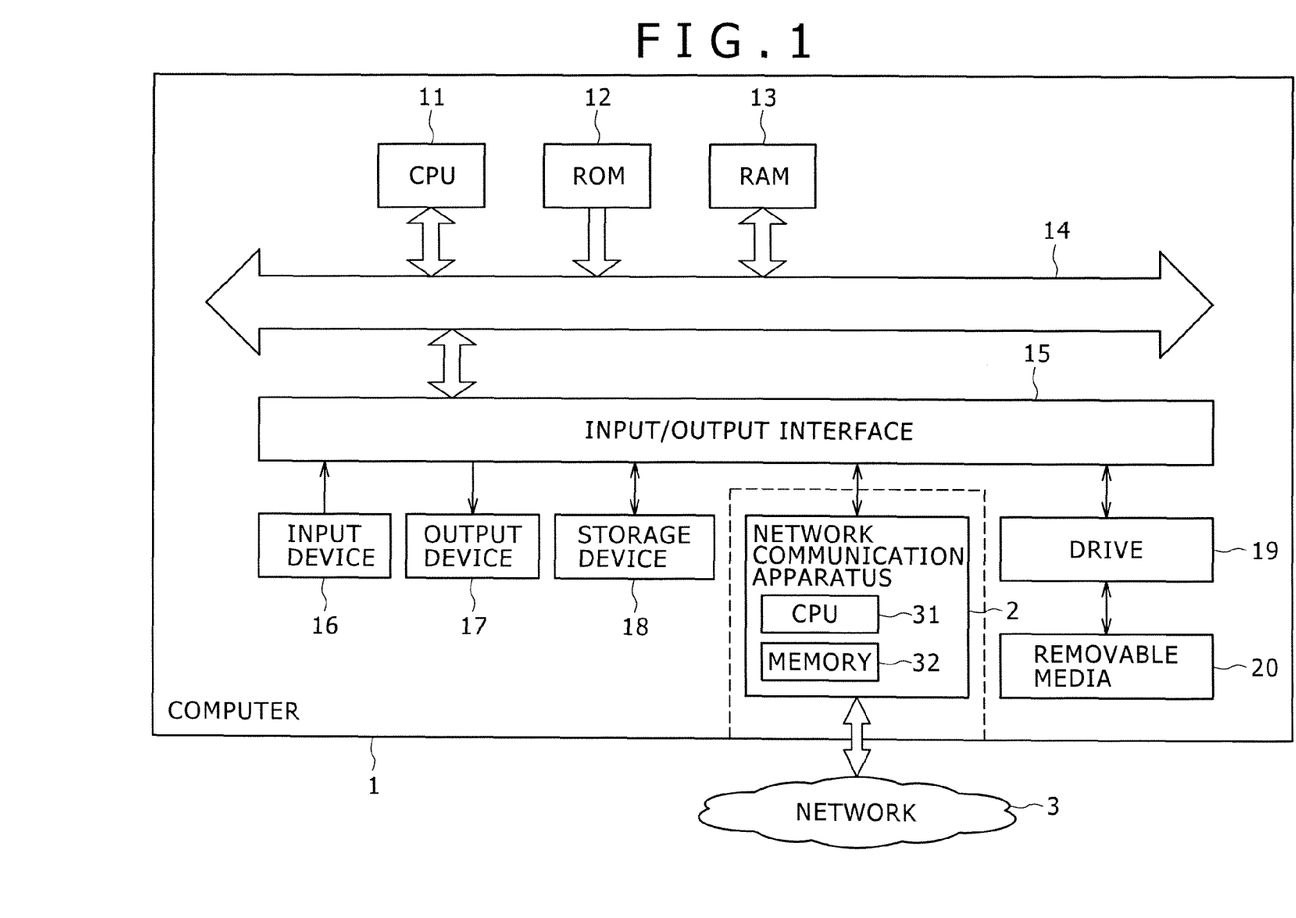
FIG. 1 is a block diagram showing a typical structure of an information processing apparatus (network communication apparatus) practiced as an embodiment of the present invention.

Preferred embodiments of the present invention will now be described with reference to the accompanying drawings. FIG. 1 is a block diagram showing a typical structure of an information processing apparatus as one embodiment of the present invention.

The computer 1 in FIG. 1 is made up of a CPU (central processing unit) 11, a ROM (read only memory) 12, a RAM (random access memory) 13, a bus 14, an input/output interface 15, an input device 16, an output device 17, a storage device 18, and a drive 19.

A card-shaped network communication apparatus 2 is attached to the computer 1. The network communication apparatus 2 is connected to an input/output interface 15. By outputting data to the network communication apparatus 2, the computer 1 can have the data sent to an external apparatus connected to a network 3 such as the Internet or a local area network. In the ensuing description, the equipment to which the computer 1 sends its data will be referred to as the communicating party.

The CPU 11 carries out diverse processes in accordance with the programs (i.e., OS (operating system) and application programs) held in the ROM 12 or storage device 18. The RAM 13 accommodates the programs or the data to be carried out or operated on by the CPU 11 as needed. The CPU 11, ROM 12, and RAM 13 are interconnected by the bus 14.

The input/output interface 15 is connected to the CPU 11 via the bus 14. The input/output interface 15 is further connected to an input device 16 and an output device 17. The input device 15 is typically made up of a keyboard, a mouse and a microphone; and the output device 17 is illustratively composed of speakers and a display such as a CRT (cathode ray tube) or an LCD (liquid crystal display). The CPU 11 performs various processes in response to commands that are input from the input device 16. The result of the processing is sent from the CPU 11 to the output device 17.

The storage device 18 is connected to the input/output interface 15 and typically composed of a hard disk drive. As such, the storage device 18 holds diverse programs and/or data executed and/or operated on by the CPU 11.

The drive 19 is connected to the input/output interface 15 and mounted with such removable media such 20 as a magnetic disk, an optical disk, a magneto-optical disk, or a semiconductor memory. Computer programs and/or data may be retrieved by the drive 19 from the mounted medium and transferred as needed to the storage device 18 for storage. Alternatively, computer programs and/or data may be acquired through the network communication apparatus 2 and stored into the storage device 18.

The network communication apparatus 2 (information processing apparatus) has at least a CPU 31 and a memory 32. As in the case of an NIC (network interface card), the network communication apparatus 2 connects to the network 3 by executing an appropriate program held in the memory 32. With the connection established, the network communication apparatus 2 sends onto the network 3 the data from the application being executed by the CPU 11. Unlike the typical NIC, the network communication apparatus 2 carries out internally (i.e., inside the chip) the processes associated with the protocol in use such as the TCP/IP (Transmission Control Protocol/Internet Protocol). That means there is no need for the application being run by the CPU 11 to execute the protocol processing upon data transmission; the application need only forward outgoing data to the network communication apparatus 2.

When data is sent in from the communicating party over the network 3, the network communication apparatus 2 receives the incoming data and forwards the received data to the application being carried out by the CPU 11.

Figure 2:
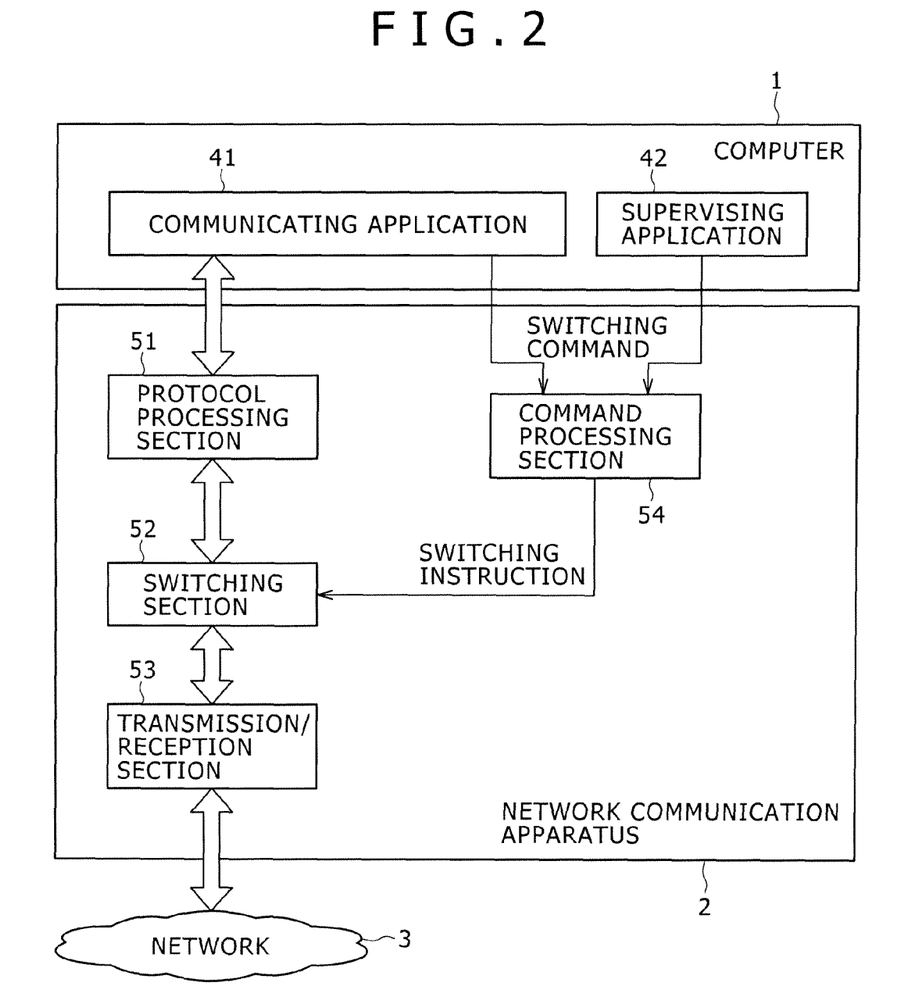
FIG. 2 is a first functional block diagram of a computer and a network communication apparatus.

FIG. 2 is a first functional block diagram of the computer 1 and network communication apparatus 2 (the computer 1 and network communication apparatus 2 constitute a first embodiment of the invention).

The computer 1 is assumed to run a communicating application 41 and a supervising application 42 as its application programs (software). The network communication apparatus 2 forms a protocol processing section 51, a switching section 52, a transmission/reception section 53, and a command processing section 54 by executing appropriate programs held in the memory 32 (FIG. 1).

The communicating application 41 at least has a data output function for outputting data to the communicating party connected to the network 3. Illustratively, the communicating application 41 sends the result of predetermined processes to the communicating party, performs suitable processes on the data received from the communicating party, and outputs (i.e., returns) the result of the processing on the received data to the communicating party. Using its data output function, the communicating application 41 forwards outgoing data (destined for the communicating party) to the protocol processing section 51.

If the communicating application 41 detects by itself a failure in the processing of its data output function (the processing will be referred to as the data output processing) such as the output of unnecessary data, then the application 41 will output a first switching command to the command processing section 54 of the network communication apparatus 2. The first switching command is designed to effect disconnection from the network 3 so as to prevent the data coming from the communicating application 41 from getting output onto the network 3.

However, the communicating application 41 has often difficulty in detecting such a failure of the data output processing. That is because failures in the data output processing are frequently triggered by a runaway of the communicating application 41 itself.

In order to forestall such an eventuality, the supervising application 42 supervises the data output processing of the communicating application 41. If a failure is detected in the data output processing of the communicating application 41, the supervising application 42 outputs to the command processing section 54 the first switching command to disconnect from the network 3. Alternatively, the supervising application 42 may accept the operation of the user (i.e., user of the computer 1) and may send the first switching command to the command processing section 54 in accordance with the user's instruction. That is, the user may verify whether any fault has occurred in the data output processing of the communicating application 41. On detecting a failure in the data output processing, the user may instruct the supervising application 42 to output the first switching command to the command processing section 54.

Upon recovery from the failure in the data output processing of the communicating application 41, each of the communicating application 41 and supervising application 42 may output a second switching command to the command processing section 54. The second switching command is designed to reestablish a connection with the network 3.

The protocol processing section 51 in the network communication apparatus 2 performs protocol processing on the data supplied from the communicating application 41. The protocol in use may illustratively be the above-mentioned TCP/IP. The processed data is sent from the protocol processing section 51 to the switching section 52.

In response to a switching instruction coming from the command processing section 54, the switching section 52 switches on or off the connection between the protocol processing section 51 and the transmission/reception section 53. The switching instruction from the command processing section 54 corresponds to the first or the second switching command described above.

The transmission/reception section 53 is formed illustratively by a metal terminal or a modular connector such as an RJ-45 connector and handles data transmission and reception on the physical layer level. It follows that the connection or disconnection effected by the switching section 52 between the protocol processing section 51 and the transmission/reception section 53 signifies connection or disconnection on or close to the physical layer level. For example, if the transmission/reception section 53 is an RJ-45 connector, then the connection and disconnection are processes equivalent to the attaching and detaching of the connector. In other words, the connection or disconnection effected by the switching section 52 between the protocol processing section 51 and the transmission/reception section 53 represents connection to or disconnection from the network 3.

When supplied with the first switching command from the communicating application 41 or supervising application 42, the command processing section 54 outputs to the switching section 52 a switching instruction to disconnect from the network 3. Given the second switching command from the communicating application 41 or supervising application 42, the command processing section 54 outputs to the switching section 52 a switching instruction to connect to the network 3 (i.e., to reestablish a connection with the network 3 following the disconnection).

Figure 3:
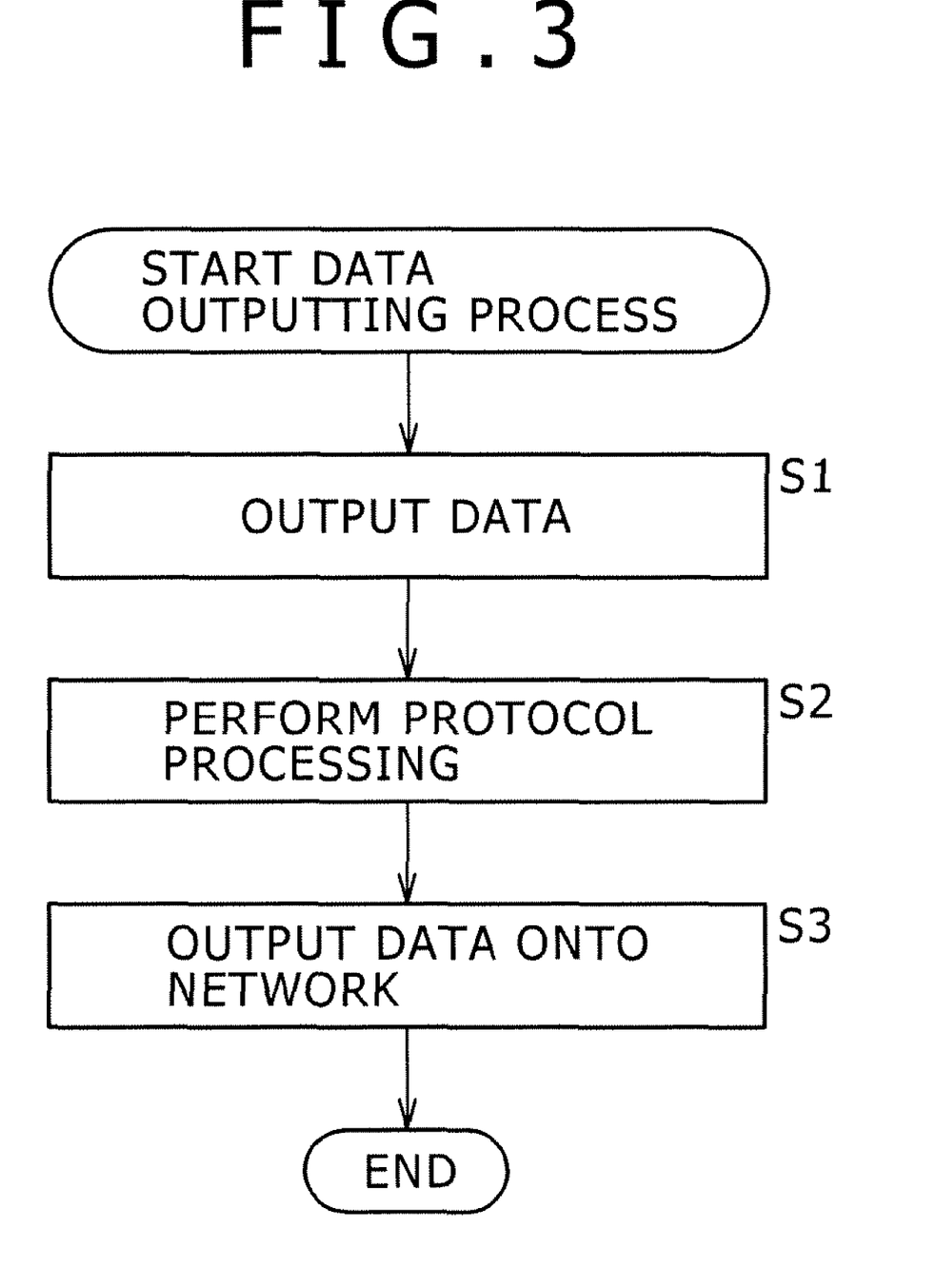
FIG. 3 is a flowchart of steps constituting a data outputting process.

Described below with reference to the flowchart of FIG. 3 is a data outputting process performed when the data output function of the communicating application 41 is working normally.

In step S1, the communicating application 41 performs suitable processing to output outgoing data (i.e., data destined for the communicating party) to the protocol processing section 51 in the network communication apparatus 2.

In step S2, the protocol processing section 51 carries out appropriate protocol processing on the data coming from the communicating application 41 and outputs the processed data to the switching section 52. The switching section 52, which connects the protocol processing section 51 with the transmission/reception section 53, forwards the data from the protocol processing section 51 to the transmission/reception section 53.

In step S3, the transmission/reception section 53 outputs the data from the switching section 52 onto the network 3. This brings the data outputting process to an end.

Figure 4:
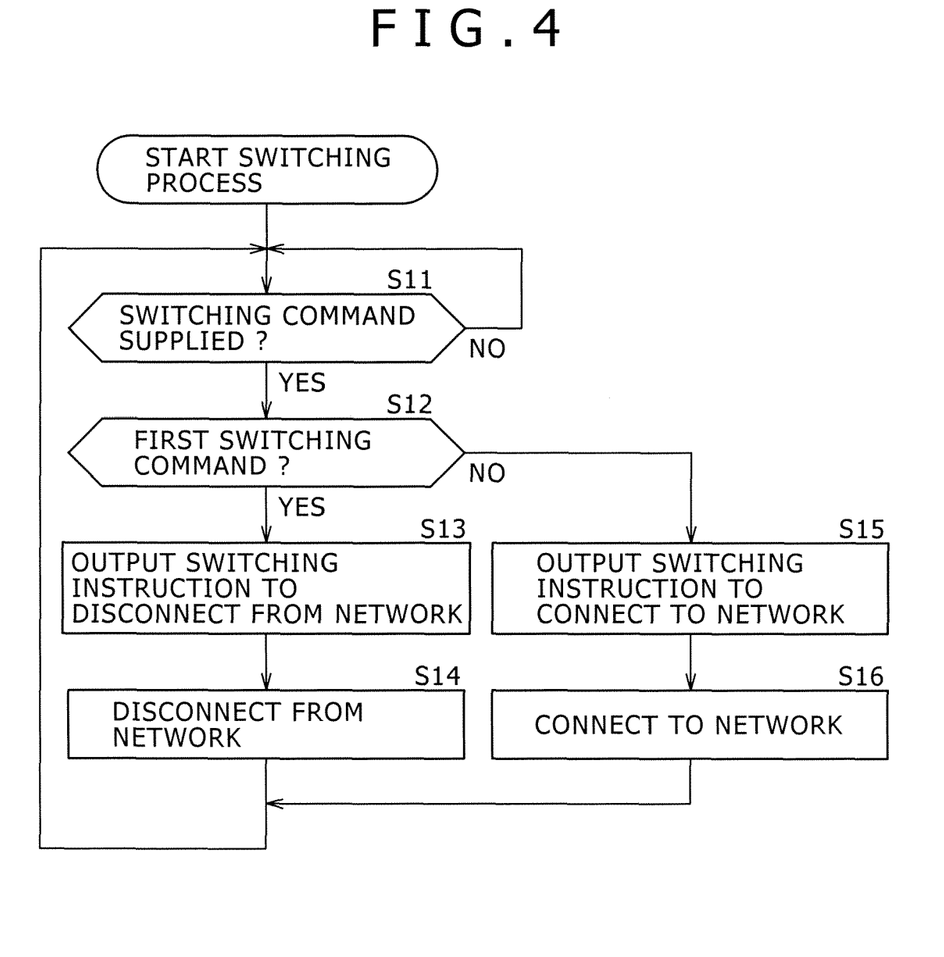
FIG. 4 is a flowchart of steps constituting a first switching process.

Meanwhile, the network communication apparatus 2 performs the switching process of FIG. 4 in preparation for an eventual failure in the data output function of the communicating application 41.

FIG. 4 is a flowchart of steps constituting the switching process (i.e., first switching process) carried out by the network communication apparatus 2. This process is performed when the network communication apparatus 2 is started.

In step S11, the command processing section 54 checks to determine whether a switching command is supplied from the communicating application 41 or supervising application 42. The command processing section 54 waits until the switching command is supplied. In the event of a failure in the data outputting process of the communicating application 41, the communicating application 41 or supervising application 42 outputs the first switching command to the command processing section 54 as discussed above, the command being designed to disconnect from the network 3. Upon recovery from the failure in the data outputting process of the communicating application 41, the communicating application 41 or supervising application 42 outputs the second switching command to the command processing section 54, the command being designed to reconnect to the network 3.

If in step S11 a switching command is found to be supplied, the command processing section 54 goes to step S12. In step S12, the command processing section 54 checks to determine whether the supplied switching command is the first switching command or the second switching command.

If in step S12 the supplied switching command is found to be the first switching command, the command processing section 54 goes to step S13. In step S13, the command processing section 54 outputs to the switching section 52 a switching instruction to disconnect from the network 3.

In step S14, the switching section 52 disconnects from the network 3 in accordance with the switching instruction coming from the command processing section 54.

If in step S12 the supplied switching command is found to be the second switching command, the command processing section goes to step S15. In step S15, the command processing section 54 outputs to the switching section 52 a switching instruction to connect to the network 3 (i.e., to reestablish a connection with the network 3).

In step S16, the switching section 52 connects to the network 3 in accordance with the switching instruction coming from the command processing section 54.

Following step S14 or S16, control is returned to step S11. Steps S11 through S16 are then repeated. That is, a check is made to see if another switching command is received. Upon receipt of the switching command, the connection with the network 3 is switched on or off accordingly.

As described, in case of a failure in the data outputting process of the communicating application 41, the communicating application 41 or supervising application 42 sends the first switching command to the command processing section 54 in the network communication apparatus 2, the command being designed to disconnect from the network 3. Upon receipt of the first switching command, the command processing section 54 outputs to the switching section 52 a switching instruction to disconnect from the network 3. The connection with the network 3 is then switched off by the switching section 52.

Upon recovery from the failure in the data outputting process of the communicating application 41, the communicating application 41 or supervising application 42 supplies the second switching command to the command processing section 54, the command being designed to reestablish a connection with the network 3. Upon receipt of the second switching command, the command processing section 54 outputs to the switching section 52 a switching instruction to reconnect to the network 3. The connection with the network 3 is then switched on by the switching section 52.

That is, in the event of a failure in the data outputting process of the communicating application 41, the switching section 52 disconnects from the network 3, thus preventing unnecessary data coming out of the communicating application 41 from getting output onto the network 3. When the fault in the data outputting process is eliminated, the connection with the network 3 is again switched on.

Figure 5:
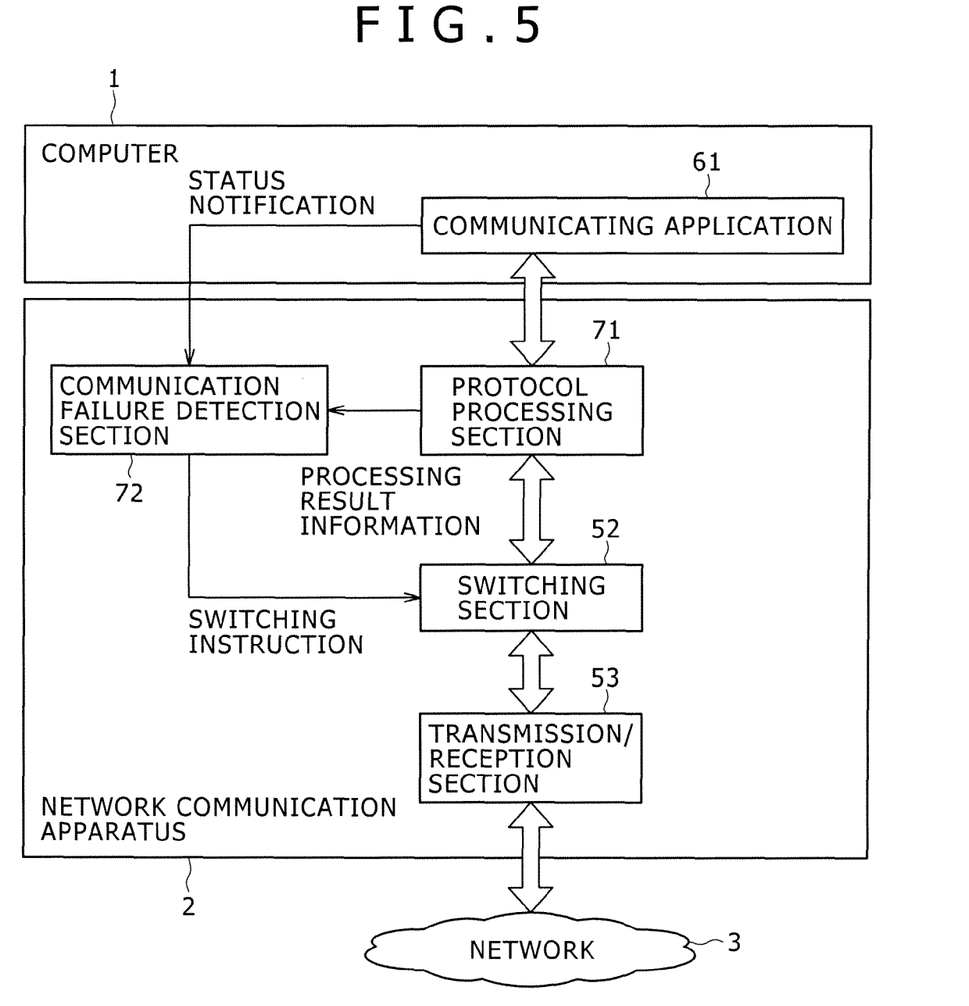
FIG. 5 is a second functional block diagram of the computer and network communication apparatus.

FIG. 5 is a second functional block diagram of the computer 1 and network communication apparatus 2 (practiced as a second embodiment of the invention). Of the reference characters in FIG. 5, those already used in FIG. 2 designate like or corresponding parts, and their descriptions are omitted where redundant.

Whereas the computer 1 in FIG. 2 was shown to include the communicating application 41 and supervising application 42, the computer 1 in FIG. 5 has a communicating application 61 alone.

As in the case of its counterpart in FIG. 2, the network communication apparatus 2 in FIG. 5 contains the switching section 52 and transmission/reception section 53. Unlike its counterpart in FIG. 2, the network communication apparatus 2 in FIG. 5 has a protocol processing section 71 replacing the protocol processing section 51, newly incorporates a communication failure detection section 72, and dispenses with the command processing section 54 that was part of the apparatus 2 in FIG. 2.

As with the above-described communicating application 41, the communicating application 61 outputs outgoing data (i.e., data destined for the communicating party) to the protocol processing section 71. The communicating application 61 periodically outputs a status notification to the communication failure detection section 72, the notification being indicative of ongoing normal communication with the protocol processing section 71 in the network communication apparatus 2 (i.e., data output status is indicated). When the status notification is being supplied periodically from the communicating application 61 to the communication failure detection section 72, that means the outgoing data is transferred from the communicating application 61 to the protocol processing section 71 within a predetermined period of time.

Like the protocol processing section 51, the protocol processing section 71 carries out suitable processes on a predetermined protocol such as the TCP/IP (i.e., protocol processing). The protocol processing section 71 supplies the communication failure detection section 72 periodically (or intermittently) with information about the result of the processing it has carried out (i.e., processing result information). Typically, the processing result information is made up of statistical information about the packets transmitted and received, such as the number of packets exchanged with the communicating party and the number of packets that have been lost.

The communication failure detection section 72 supervises the data outputting process of the communicating application 61. In other words, the supervising function for the supervising application 42 to monitor the data outputting process of the communicating application 41 in the first embodiment of FIG. 2 is taken over by the communication failure detection section 72 in the second embodiment of FIG. 5.

Based on the status notification from the communicating application 61 and on the processing result information from the protocol processing section 71, the communication failure detection section 72 detects a first or a second failure. The first failure refers to a state in which the amount of the data output by the communicating application 71 is below a predetermined level. The second failure signifies a state where the amount of the data output by the communicating application 71 is in excess of a predetermined level.

As mentioned above, when the status notification is being fed periodically from the communicating application 61 to the communication failure detection section 72, that means the communicating application 61 is transferring the outgoing data (destined for the communicating party) to the protocol processing section 71 within a predetermined time period. If the status notification is not sent from the communicating application 61 to the communication failure detection section 72 within the predetermined time period, that means the communicating application 61 has stopped outputting data to the protocol processing section 71. In such a case, the communication error detection section 72 detects the first failure indicative of the state in which the size of the data output by the communicating application 61 is less than expected.

When the processing result information fed from the protocol processing section 71 is found in excess of a predetermined level, the communication failure detection section 72 detects the second failure denoting the state in which the size of the data output by the communicating application 61 is larger than a predetermined reference data size. Typically, the reference data size is the maximum amount of communications assumed in the hardware design stage for the network communication apparatus 2.

Upon detection of the first or the second failure, the communication failure detection section 72 outputs to the switching section 52 a switching instruction to disconnect from the network 3. When the first or the second failure is no longer detected, the communication failure detection section 72 outputs to the switching section 72 a switching instruction to connect to the network 3 (i.e., to reestablish a connection with the network 3).

Figure 6:
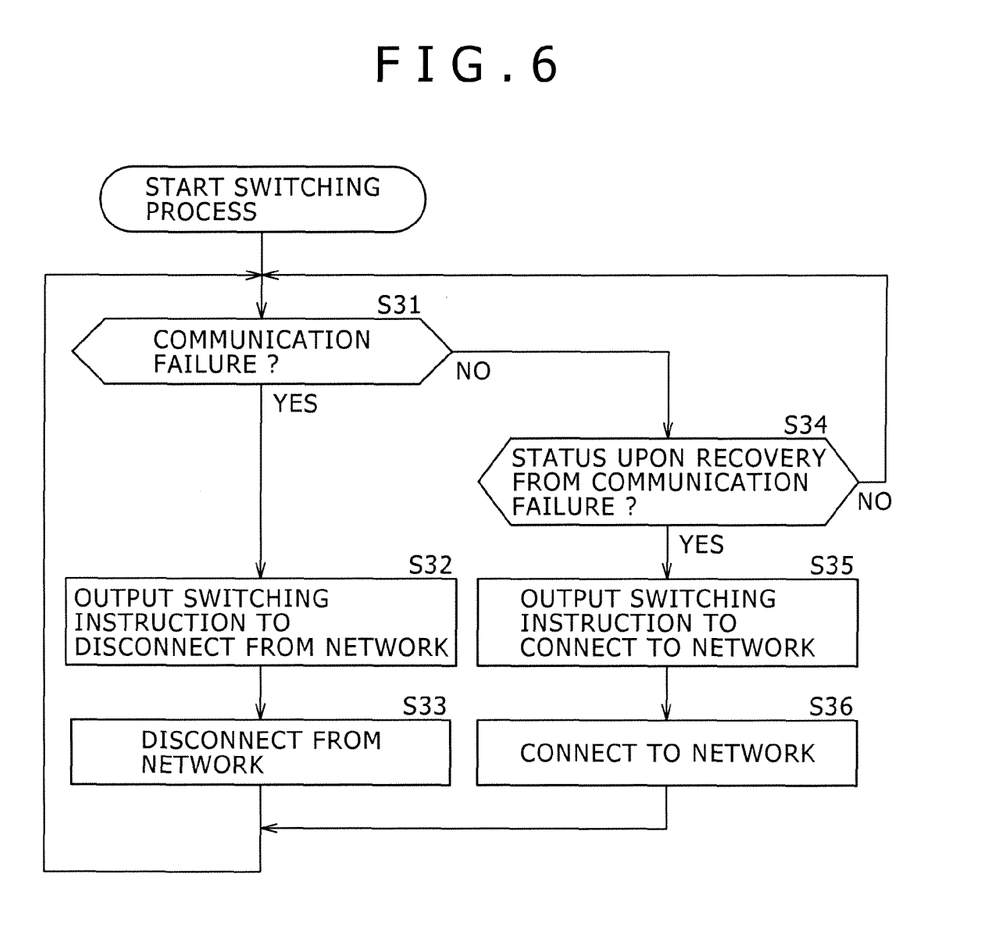
FIG. 6 is a flowchart of steps constituting a second switching process.

FIG. 6 is a flowchart of steps constituting the switching process (i.e., second switching process) performed by the network communication apparatus 2 in FIG. 5. This process is carried out when the network communication apparatus 2 is started.

In step S31, the communication failure detection section 72 supervises the data outputting process of the communicating application 61 based on the status notification from the communicating application 61 and on the processing result information from the protocol processing section 71. In so doing, the communication failure detection section 72 determines whether any communication failure has occurred.

If in step S31 a communication failure is found to have occurred, step S32 is reached. In step S32, the communication failure detection section 72 outputs to the switching section 52 a switching instruction to disconnect from the network 3.

In step S33, the switching section 52 disconnects from the network 3 in accordance with the switching instruction coming from the communication failure detection section 72.

If in step S31 no communication failure is detected, i.e., if communication is found to be taking place normally, then step S34 is reached. In step S34, the communication failure detection section 72 checks to determine whether the communicating application 71 has just recovered from an earlier communication failure.

If in step S34 the communicating application 71 is not found to have recovered from the earlier communication failure, i.e., if normal communication is found to have been in progress, then control is returned to step S31. The communication failure detection section 72 then continues to supervise the data outputting process of the communicating application 61 in step S31.

If in step S34 the communicating application 61 is found to have just recovered from the earlier communication failure, then step S35 is reached. In step S35, the communication failure detection section 72 outputs to the switching section 52 a switching instruction to connect to the network 3 (i.e., to reestablish a connection with the network 3).

In step S36, the switching section 52 connects to the network 3 in accordance with the switching instruction coming from the communication failure detection section 72.

Following step S33 or S36, control is returned to step S31. Steps S31 through S36 are then repeated so as to continue the checks on any communication failure. The connection with the network 3 is switched on or off depending the presence or absence of a communication failure.

As described, the communication failure detection section 72 checks continuously to determine whether a first or a second failure has occurred, the first failure denoting the case where the amount of the data output by the communicating application 61 is less than a predetermined level, the second failure representing the case in which the amount of the data output by the communicating application 61 is larger than a predetermined size. In the event of the first or the second failure in the data outputting process of the communicating application 61, the communication failure detection section 72 outputs to the switching section 52 a switching instruction to disconnect from the network 3. The instruction causes the switching section 52 to switch off the connection with the network 3. Upon recovery from the failure in the data outputting process of the communicating application 61, the communication failure detection section 72 outputs to the switching section 52 a switching instruction to reconnect to the network 3. The instruction causes the switching section 52 to reestablish a connection with the network 3.

That is, if a failure occurs in the data outputting process of the communicating application 61, the switching section 52 disconnects from the network 3, thereby preventing unnecessary data coming out of the communicating application 61 from getting output onto the network 3. Upon recovery from the failure in the data outputting process, the switching section 52 reconnects to the network 3.

Figure 7:
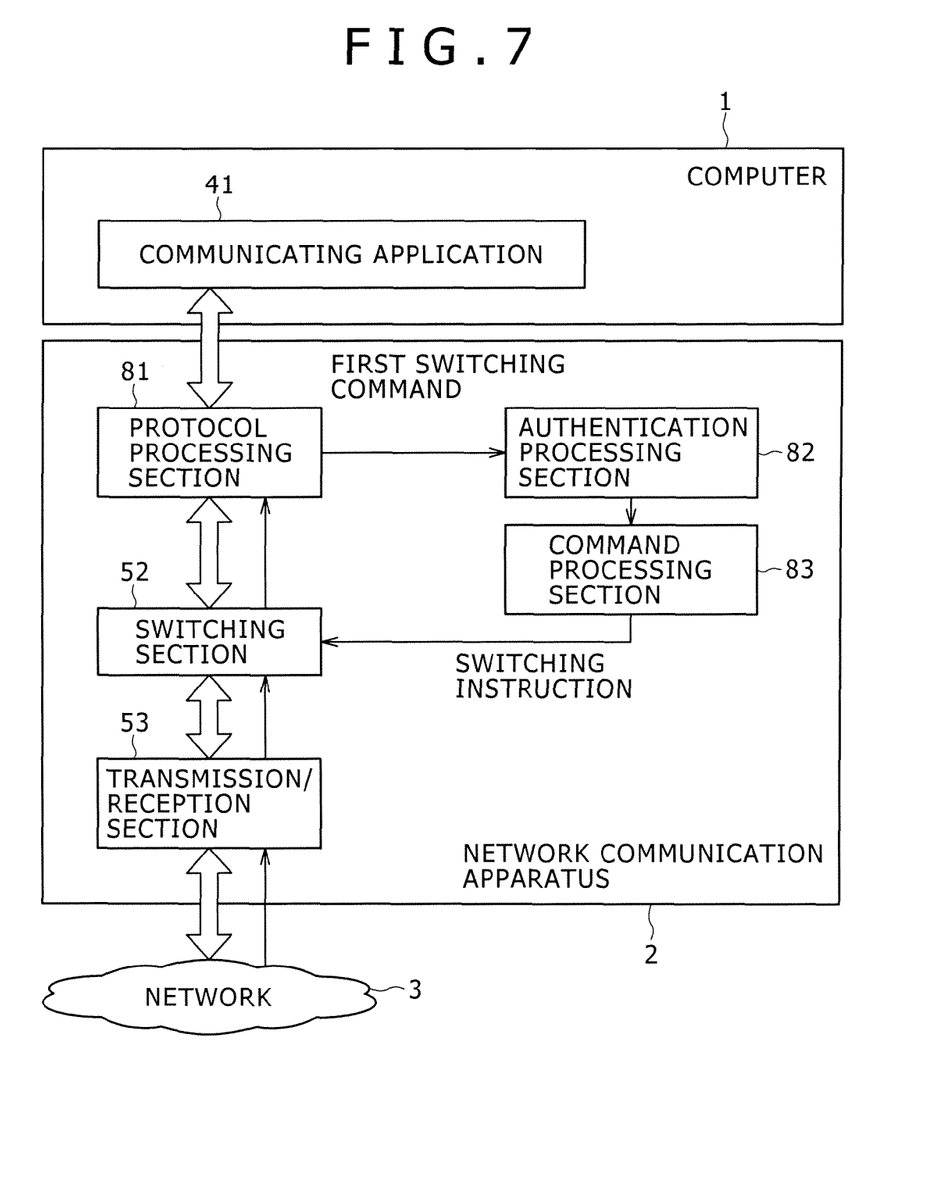
FIG. 7 is a third functional block diagram of the computer and network communication apparatus.

FIG. 7 is a third functional block diagram of the computer 1 and network communication apparatus 2 (practiced as a third embodiment of the invention). Of the reference characters in FIG. 7, those already used in FIG. 2 designate like or corresponding parts, and their descriptions are omitted where redundant.

As in the case of its counterpart in FIG. 2, the computer 1 in FIG. 7 contains the communicating application 41. Unlike its counterpart in FIG. 2, the computer 1 in FIG. 7 dispenses with the supervising application 42 that was part of the computer 1 in FIG. 2. In the computer of FIG. 7, the communicating application 41 does not output the first or the second switching command.

As with its counterpart in FIG. 2, the network communication apparatus 2 in FIG. 7 contains the switching section 52 and transmission/reception section 53. Unlike its counterpart in FIG. 2, the network communication apparatus 2 in FIG. 7 has a protocol processing section 81 and a command processing section 83 replacing the protocol processing section 51 and command processing section 54 respectively, and newly incorporates an authentication processing section 82.

Like the protocol processing section 51 mentioned above, the protocol processing section 81 performs processes associated with the protocol in use such as the TCP/IP. The protocol processing section 81 checks to determine whether the data sent from the communicating party is a first switching command or some other data. If reception of a first switching command is detected, the protocol processing section 81 supplies the received first switching command to the authentication processing section 82. If the received data is found to be data other than the first switching command, the protocol processing section 81 forwards the data to the communicating application 41.

The authentication processing section 82 authenticates whether the first switching command fed from the protocol processing section 81 has come from a legitimate communicating party. The method of authentication is not limited to any particular technique. Illustratively, an authentication code is attached to the switching command. A check is then made to see if the attached code is a previously issued code that belongs to the legitimate communicating party (i.e., to the party's apparatus). Alternatively, upon receipt of the switching command, a challenge-response authentication mechanism may be used to determine whether the communicating party that sent in the command is a legitimate party. When the first switching command from the protocol processing section 81 is found to be sent from the legitimate communicating party, the authentication processing party 82 forwards the received first switching command to the command processing section 83.

The authenticating process performed by the authentication processing section 82 may be omitted. In that case, the first switching command coming from the protocol processing section 81 is passed directly to the command processing section 83.

Like the command processing section 54 in FIG. 2, the command processing section 83 outputs to the switching section 52 a switching instruction corresponding to the first switching command that was supplied.

Figure 8:
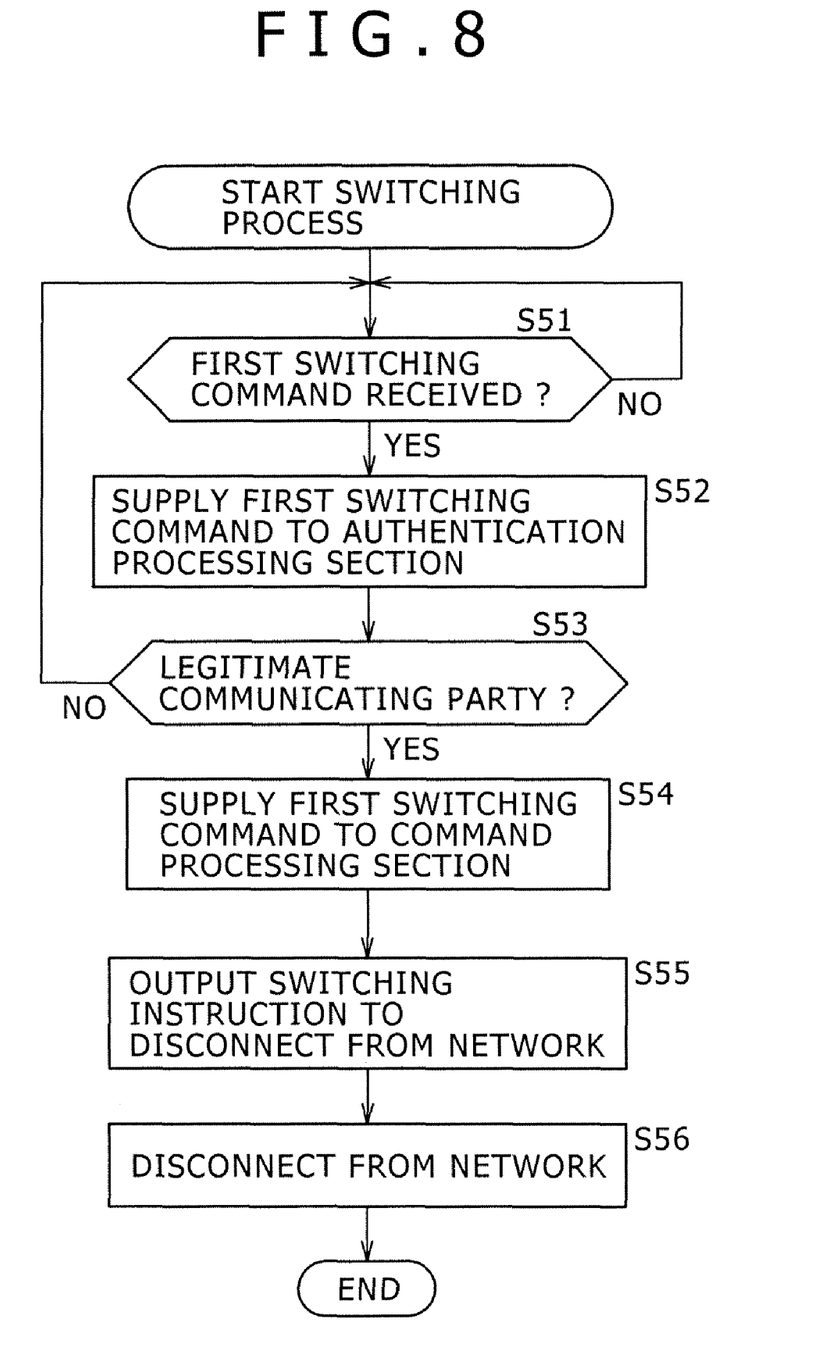
FIG. 8 is a flowchart of steps constituting a third switching process.

FIG. 8 is a flowchart of steps constituting the switching process (i.e., third switching process) performed by the network communication apparatus 2 in FIG. 7. This process is carried out when the network communication apparatus 2 is started.

In step S51, the protocol processing section 81 checks to determine whether a first switching command is received. The protocol processing section 81 waits until the first switching command is received.

If in step S51 the first switching command is found to be received, step S52 is reached. In step S52, the protocol processing section 81 forwards the received first switching command to the authentication processing section 82.

In step S53, the authentication processing section 82 authenticates the communicating party that has sent the first switching command. That is, the authentication processing section 82 authenticates whether the apparatus having transmitted the first switching command is a legitimate communicating party.

If in step S53 the supplied first switching command is not found to be from a legitimate communicating party, then the authentication processing section 82 returns to step S51.

If in step S53 the supplied first switching command is found to be received from a legitimate communicating party, the authentication processing section 82 goes to step S54. In step S54, the authentication processing section 82 forwards the supplied first switching command to the command processing section 83.

In step S55, the command processing section 83 outputs to the switching section 52 a switching instruction to disconnect from the network 3.

In step S56, the switching section 52 switches off the connection with the network 3 in accordance with the switching instruction coming from the command processing section 83. This brings the switching process of FIG. 8 to an end.

As described, in the event of a failure in the data outputting process of the communicating application 41, the first switching command is sent to the network communication apparatus 2. The protocol processing section 81 feeds the received first switching command to the authentication processing section 82. The authentication processing section 82 checks to determine whether the first switching command has come from a legitimate communicating party. If the first switching command is found to be received from the legitimate communicating party, then the authentication processing section 82 forwards the first switching command to the command processing section 83. In turn, the command processing section 83 outputs to the switching section 52 a switching instruction corresponding to the first switching command. The instruction causes the switching section 52 to disconnect from the network 3.

That is, as soon as a failure is detected in the data outputting process of the communicating application 41, the switching section 52 switches off the connection with the network 3. This prevents unnecessary data coming out of the communicating application 41 from getting output onto the network 3.

In an alternative setup, the communicating party that sends the first switching command may be different from the entity with which the communicating application 41 actually communicates.

Figure 9:
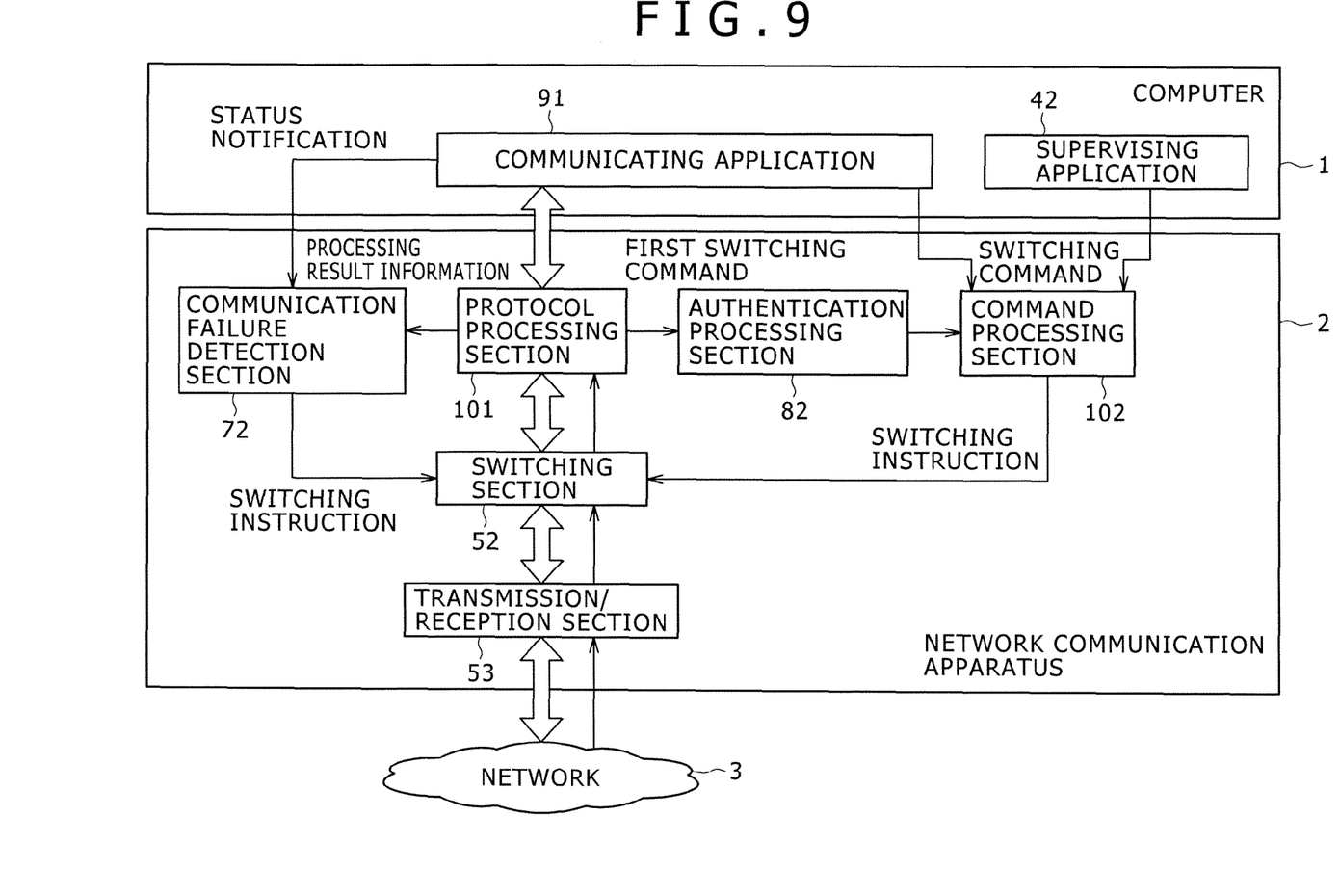
FIG. 9 is a fourth functional block diagram of the computer and network communication apparatus.

FIG. 9 is a fourth functional block diagram of the computer 1 and network communication apparatus 2 (practiced as a fourth embodiment of the invention). Of the reference characters in FIG. 9, those already used in FIG. 2 designate like or corresponding parts, and their descriptions are omitted where redundant.

The computer 1 and the network communication apparatus 2 in FIG. 9 have all the functions that have already been discussed above in reference to FIGS. 2, 5, and 7.

The computer 1 includes a communicating application 91 and a supervising application 42. The network communication apparatus 2 is made up of a protocol processing section 101, a switching section 52, a transmission/reception section 53, a communication failure detection section 72, an authentication processing section 82, and a command processing section 102.

In addition to its data output function, the communicating application 91 offers another two functions: the function of outputting a switching command to the command processing section 102 as with the communicating application 41 in FIG. 2, and the function of outputting a status notification periodically to the communication failure detection section 72 like the communicating application 61 in FIG. 5.

Besides its protocol processing function, the protocol processing section 101 has two more functions: the function of feeding processing result information periodically to the communication failure detection section 72 like the protocol processing section 71 in FIG. 5; and the function of supplying the authentication processing section 82 with the first switching command that was sent from the communicating party, as in the case of the protocol processing section 81 in FIG. 7.

The switching section 52 switches on or off the connection of the network communication apparatus 2 with the network 3 in accordance with the switching instruction coming from the communication failure detection section 72 or from the command processing section 102.

The command processing section 102 offers two major functions: the function of receiving a first or a second switching command from the communicating application 91 or supervising application 42 and outputting to the switching section 52 a switching instruction corresponding to the first or the second switching command received as in the case of the command processing section 54 in FIG. 2; and the function of receiving the first switching command from the authentication processing section 82 and outputting to the switching section 52 a switching instruction corresponding to the received first switching command, as with the command processing section 83 in FIG. 7.

Suppose that in the above-described network communication apparatus 2 of FIG. 9, a failure occurs in the data outputting process of the communicating application 91. In that case, the connection with the network 3 is switched off by any one of three commands: a switching command coming from the communicating application 91 or supervising application 42, a switching command sent from the communicating party, or a switching command issued by the communication failure detection section 72. This makes it possible to prevent unnecessary data coming out of the communicating application 91 from getting output onto the network 3.

Besides being shaped as a removable card, the network communication apparatus 2 may be structured as a chip (including a multi-chip module) using ASIC (Applications Specific Integrated Circuit) or FPGA (Field Programmable Gate Alley) arrangements. In other words, the network communication apparatus 2 is not limited to any specific physical shape as long as it offers the above-described functions on a hardware basis. As such, the network communication apparatus 2 can be incorporated not only in the computer 1 but also in devices capable of communicating with external equipment over the network 3, in recording/reproducing apparatuses for recording and reproducing data to and from recording media such as hard disks or DVD (digital versatile disks), and in TV sets.

In this specification, the steps making up the above-described flowcharts represent not only the processes that are to be carried out in the depicted sequence (i.e., on a time series basis) but also processes that may be performed parallelly or individually and not chronologically.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus comprising:
   a communication unit that connects to a network and that controls transmission to said network of data being output by an external apparatus having at least a data output function such that the data output by the external apparatus is output to the network via the information processing apparatus; and
   a connection switcher configured to
      detect a failure in data output processing from said data output function of said external apparatus by receiving an output of data by the external apparatus and monitoring for faulty data in the output,
      disconnect both the information processing apparatus and the external apparatus from said network in response to the detection of the failure in the data output processing of said data output function of said external apparatus, and
      reconnect both the information processing apparatus and the external apparatus to said network upon recovery from said failure.

2. The information processing apparatus according to claim 1, wherein said external apparatus issues a first command in case of a failure in said data output processing and issues a second command upon recovery from said failure; and
   wherein said connection switcher disconnects from said network when said external apparatus issues said first command and reconnects to said network when said external apparatus issues said second command.

3. The information processing apparatus according to claim 1, further comprising a supervisor configured to supervise said data output processing;
   wherein said connection switcher disconnects from said network when said supervisor detects a failure in said data output processing and reconnects to said network when said supervisor detects a recovery from said failure.

4. The information processing apparatus according to claim 3, wherein said supervisor detects a first and a second failure individually by supervising said data output processing, said first failure being detected when a predetermined data size is not exceed by the data being output by said external apparatus, said second failure being detected when a predetermined data size is exceeded by the data being output by said external apparatus.

5. The information processing apparatus according to claim 4, wherein said external apparatus further comprises, in addition to said data output function, a status output function configured to output a status notification representing output status of said data; and
   wherein, when said status notification is not output periodically by said external apparatus, then said supervisor detects said first failure.

6. The information processing apparatus according to claim 4, further comprising a protocol processor configured to perform protocol processing on said data being output by said external apparatus;
   wherein said supervisor detects said second failure based on processing result information output by said protocol processor regarding said data.

7. The information processing apparatus according to claim 1, wherein said connection switcher disconnects from said network when a predetermined command is sent from said external apparatus over said network.

8. The information processing apparatus according to claim 7, further comprising an authenticator configured to authenticate said external apparatus.

9. An information processing method executed by an information processing apparatus which connects to a network and which controls transmission to said network of data being output by an external apparatus having at least a data output function such that the data output by the external apparatus is output to the network via the information processing apparatus, said information processing method comprising:
   detecting a failure in data output processing from said data output function of said external apparatus by receiving an output of data by the external apparatus and monitoring for faulty data in the output;
   disconnecting both the information processing apparatus and the external apparatus from said network in response to the detection of the failure in the data output processing of said data output function of said external apparatus; and
   reconnecting both the information processing apparatus and the external apparatus to said network upon recovery from said failure.

10. A non-transitory computer readable medium having stored thereon a program that when executed by an information processing apparatus causes the information processing apparatus to execute a method, the information processing apparatus connected to a network and controlling transmission to said network of data being output by an external apparatus having at least a data output function such that the data output by the external apparatus is output to the network via the information processing apparatus, the method comprising:

detecting a failure in data output processing from said data output function of said external apparatus by receiving an output of data by the external apparatus and monitoring for faulty data in the output;

disconnecting both the information processing apparatus and the external apparatus from said network in response to the detection of the failure in the data output processing of said data output function of said external apparatus; and     reconnecting both the information processing apparatus and the external apparatus to said network upon recovery from said failure.

11. An information processing apparatus comprising:

a communication unit that connects to a network and that controls transmission to said network of data being output by an external apparatus having at least a data output function such that the data output by the external apparatus is output to the network via the information processing apparatus; and a connection switcher configured to     detect a failure in data output processing from said data output function of said external apparatus based on receiving a command from the external apparatus indicating that output of faulty data has been detected by the external apparatus,     disconnect both the information processing apparatus and the external apparatus from said network in response to the detection of the failure in the data output processing of said data output function of said external apparatus, and     reconnect both the information processing apparatus and the external apparatus to said network upon recovery from said failure.

\* \* \* \* \*